United States Patent
Salmi

(10) Patent No.: US 7,479,768 B1
(45) Date of Patent: Jan. 20, 2009

(54) SYSTEM AND METHOD FOR PROVIDING VARIABLE GAIN LOOP CONTROL FOR USE IN ADAPTIVE VOLTAGE SCALING

(75) Inventor: Pasi Salmi, Kemi (FI)

(73) Assignee: National Semiconductor Corporation, Santa Clara, CA (US)

( * ) Notice: Subject to any disclaimer, the term of this patent is extended or adjusted under 35 U.S.C. 154(b) by 564 days.

(21) Appl. No.: 11/138,581

(22) Filed: May 26, 2005

(51) Int. Cl.
*G05F 1/613* (2006.01)
(52) U.S. Cl. .......................................... 323/224; 331/16
(58) Field of Classification Search .................. 331/16, 331/17; 323/224
See application file for complete search history.

(56) References Cited

U.S. PATENT DOCUMENTS 6,548,991 B1 4/2003 Maksimovic et al.
6,583,675 B2 * 6/2003 Gomez ......................... 331/17

OTHER PUBLICATIONS

Yee William Li et al., "Asynchronous Datapath with Software-Controlled On-Chip Adaptive Voltage Scaling for Multirate Signal Processing Applications", Proceedings of the Ninth International Symposium on Asynchronous Circuits and Systems (ASYNC'03), 2003 IEEE.
Woonseok Kim et al., "Preemption-Aware Dynamic Voltage Scaling in Hard Real-Time Systems", Proceedings of the 2004 International Symposium on Low Power-Electronics and Design (ISLPED'04), pp. 393-398.
Sandeep Dhar et al., "Switching Regulator with Dynamically Adjustable Supply Voltage for Low Power VLSI", IECON'01: The 27th Annual Conference of the IEEE Industrial Electronics Society, pp. 1874-1879.

* cited by examiner

*Primary Examiner*—Joseph Chang

(57) ABSTRACT

A system and method is disclosed for providing efficient closed loop feedback control in an adaptive voltage scaling system. The closed loop feedback circuitry of the invention comprises variable feedback gain for an error amplifier circuit. In one embodiment the variable feedback gain comprises a low value of feedback gain and a high value of feedback gain. The value of feedback gain that is employed determines the speed of response of the system (1) to performance level changes of an adjustable supply voltage, and (2) to disturbances such as temperature changes, IR voltage drops, and ripple voltages. The variable feedback gain feature enables the use of adaptive voltage scaling regulators that have outputs with relatively high ripple voltage.

20 Claims, 5 Drawing Sheets

SYSTEM AND METHOD FOR PROVIDING VARIABLE GAIN LOOP CONTROL FOR USE IN ADAPTIVE VOLTAGE SCALING

TECHNICAL FIELD OF THE INVENTION

The present invention relates generally to low power integrated circuits and, more particularly, to low power integrated circuits that employ multiple operating clock frequencies and adaptive voltage scaling.

BACKGROUND OF THE INVENTION

Modern digital integrated circuits such as central processing units (CPUs) are typically capable of operating with several different clock frequencies. Assume that a CPU can reduce its clock frequency while still meeting the processing requirements of an application that is running on the CPU. As is well known, a reduction in the clock frequency of the CPU proportionally reduces the CPU power consumption. With a lower clock frequency less power is consumed because there are fewer signal level changes within a given time period.

As is also well known, the power consumption of a digital circuit is quadratrically proportional to the operating voltage. Therefore, decreasing the voltage level of the operating voltage (i.e., the supply voltage) and reducing the clock frequency can provide significant power savings in a digital circuit.

Dynamic Voltage Scaling (DVS) is a power management technique in which pre-determined voltage values (within a voltage table) are used for each requested operating clock frequency of a CPU. The voltage levels that are defined in the voltage table must be carefully selected in order to adequately cover all process and temperature corners so that the CPU will function correctly at each clock frequency.

Adaptive Voltage Scaling (AVS) is a power management technique in which the supply voltage of a digital integrated circuit is adjusted automatically. The supply voltage is adjusted (using closed loop feedback) to a minimum level that is required for the proper operation of the integrated circuit at a given clock frequency.

The major difference between Dynamic Voltage Scaling (DVS) and Adaptive Voltage Scaling (AVS) is that the Adaptive Voltage Scaling (AVS) includes automatic variation of the process and temperature in order to balance the supply voltage and system delay (digital cell delay) that is due to closed loop feedback. This means that the supply voltage in the AVS system is automatically reduced at lower temperatures and for faster silicon. As the supply voltage is reduced, the power consumption is also reduced.

FIG. 1 illustrates a block diagram of an embodiment of an exemplary prior art Adaptive Voltage Scaling (AVS) System 100. AVS system 100 comprises a System-on-a-Chip (SoC) unit 110 and an Adaptive Voltage Scaling (AVS) Regulator 120. System-on-a-Chip (SoC) unit 110 comprises a Clock Management Unit (CMU) 130, a Variable Voltage Domain CPU System 140, a Hardware Performance Monitor (HPM) 150, and an Advanced Power Controller (APC) 160. The Hardware Performance Monitor (HPM) 150 is located within the Variable Voltage Domain CPU System 140.

The Clock Management Unit (CMU) 130 receives a system clock signal from a system clock unit (not shown). The Clock Management Unit (CMU) 130 provides clock frequencies for the central processing unit (CPU) (not separately shown) in the Variable Voltage Domain CPU System 140. The Clock Management Unit (CMU) 130 also provides clock frequencies for the Hardware Performance Monitor (HPM) 150. The clock frequencies that are provided to the Hardware Performance Monitor (HPM) 150 are represented by the designation "HPM CLOCK".

The Hardware Performance Monitor (HPM) 150 tracks gate delays in the current operational conditions. The Hardware Performance Monitor (HPM) 150 is in the Variable Voltage Domain CPU System 140. The Hardware Performance Monitor (HPM) 150 outputs a performance code to the Advanced Power Controller (APC) 160. The performance code indicates the propagation delay of digital gate cells. The Advanced Power Controller (APC) 160 processes the delay data and requests appropriate changes to the supply voltage.

The Advanced Power Controller (APC) 160 is coupled to and communicates with the Adaptive Voltage Scaling (AVS) Regulator 120. In one embodiment the coupling between the Advanced Power Controller (APC) 160 and the Adaptive Voltage Scaling (AVS) Regulator 120 is a PowerWise™ interface (PWI). The mark PowerWise™ is a trademark of the National Semiconductor Corporation. The Advanced Power Controller (APC) 160 sends a request to the Adaptive Voltage Scaling (AVS) Regulator 120 to change the supply voltage. The Adaptive Voltage (AVS) Regulator 120 provides the requested supply voltage level to the SoC 110. The adjustable supply voltage from the Adaptive Voltage Scaling (AVS) Regulator 120 is designated $V_{AVS}$ in FIG. 1.

The operating system of a modern central processing unit (CPU) may support a real time scheduling of performance levels. Each performance level has associated with it a specific value of operating clock frequency. The operating system is capable of selecting an operating clock frequency for which the CPU performance is minimized on a real time basis and for which the deadlines of a particular application are still met. For example, while an MPEG4 movie encoding application is running, a performance scheduling algorithm of the operating system may predict and change the performance level of the CPU in ten millisecond (10 ms) intervals.

The Hardware Performance Monitor (HPM) 150 tracks gate delays in the current operational conditions. The Hardware Performance Monitor (HPM) 150 outputs a performance code to the Advanced Power Controller 160. The performance code indicates the propagation delay of digital gate cells. In particular, Hardware Performance Monitor (HPM) 150 sends the performance code to the Advanced Power Controller 160. The Advanced Power Controller 160 then subtracts the performance code from a standard Reference Calibration Code (RCC) to obtain an error signal.

The error signal is referred to as "Slack Time". The Slack Time error signal comprises a digital error signal in a two's complement number format. If the Slack Time is positive an increase in voltage is required. If the Slack Time is negative a decrease in voltage is required. The Slack Time error signal is provided to a Compensation Unit (not shown) within the Advanced Power Controller 160. Based on the value of the Slack Time error signal, the Compensation Unit sends a signal to AVS Regulator 120 to cause AVS Regulator 120 to adjust the value of the adjustable output voltage ($V_{AVS}$) of AVS Regulator 120.

A typical prior art AVS regulator usually has an output that contains relatively high ripple voltage due to the internal operation of the AVS regulator. Typical examples of such AVS regulators with relatively high ripple voltage at the output include charge pumps and inductive switching direct current-direct current (DC-DC) converters that operate in a pulse frequency mode.

It would be advantageous if a system and method could be devised to control a slew rate speed of an adjustable supply voltage in an adaptive voltage scaling system. It would also be advantageous if a system and method could be devised to make possible the use of AVS regulators whose output contains a relatively high ripple voltage.

Therefore, there is a need in the art for a system and method that is capable of providing a more efficient closed loop feedback control in an adaptive voltage scaling system.

SUMMARY OF THE INVENTION

To address the above-discussed deficiencies of the prior art, it is a primary object of the present invention to provide a system and method for providing variable gain closed loop feedback control in an adaptive voltage scaling system.

In one advantageous embodiment the invention comprises an adaptive voltage scaling system with an error amplifier circuit that is capable of alternately operating with a low value of feedback gain and a high value of feedback gain. The value of feedback gain that is employed determines the speed of response of the system (1) to performance level changes of an adjustable supply voltage, and (2) to disturbances such as temperature changes, IR voltage drops, and ripple voltages.

The variable feedback gain feature may be used in conjunction with an adaptive voltage scaling regulator that has one or more modes of operation. The adaptive voltage scaling regulator must be capable of accomplishing a rapid voltage level change when necessary. If the adaptive voltage scaling regulator is capable of operating in more than one mode, the adaptive voltage scaling regulator must be able to activate the proper mode. If the adaptive voltage scaling regulator has only one mode, the mode must allow a rapid voltage level change to be accomplished.

In particular, the variable feedback gain feature may be used in conjunction with a dual mode adaptive voltage scaling regulator. The dual mode adaptive voltage scaling regulator is capable of alternately operating in a Pulse Width Modulation (PWM) mode and a Pulse Frequency Modulation (PFM) mode. When a central processing unit of the adaptive voltage scaling system requests a new performance level, the level of feedback gain is increased, so that a rapid supply voltage change may be accomplished. The mode of the dual mode adaptive voltage scaling regulator is set to a Pulse Width Modulation (PWM) mode during the large voltage level change.

After the value of supply voltage is stabilized at its new value, the mode of the dual mode adaptive voltage scaling regulator can be reset to the Pulse Frequency Modulation mode in order to maintain high power efficiency during light load conditions. The adaptive voltage scaling regulator changes its mode to Pulse Frequency Modulation only if it detects a light load (i.e., a load under a specified threshold) so that changing the mode to Pulse Frequency Modulation will improve the power efficiency of the adaptive voltage scaling regulator. If a relatively high load is detected, the adaptive voltage scaling regulator will not change the mode to Pulse Frequency Modulation but will keep the Pulse Width Modulation mode activated.

In one advantageous embodiment the rejection of the ripple voltage of the dual mode adaptive voltage scaling regulator is accomplished by using the low value of feedback gain. The adaptive voltage scaling system of the invention averages the ripple voltage to a constant direct current (DC) level.

It is an object of the present invention to provide a system and method for providing variable gain closed loop feedback control in an adaptive voltage scaling system.

It is another object of the invention to provide a system and method for controlling a slew rate speed of an adjustable supply voltage in an adaptive voltage scaling system.

It is yet another object of the present invention to provide a system and method for using in an adaptive voltage scaling system an adaptive voltage scaling regulator whose output contains a relatively high ripple voltage.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future, uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 2 through 6, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged adaptive voltage scaling (AVS) system.

Figure 1:
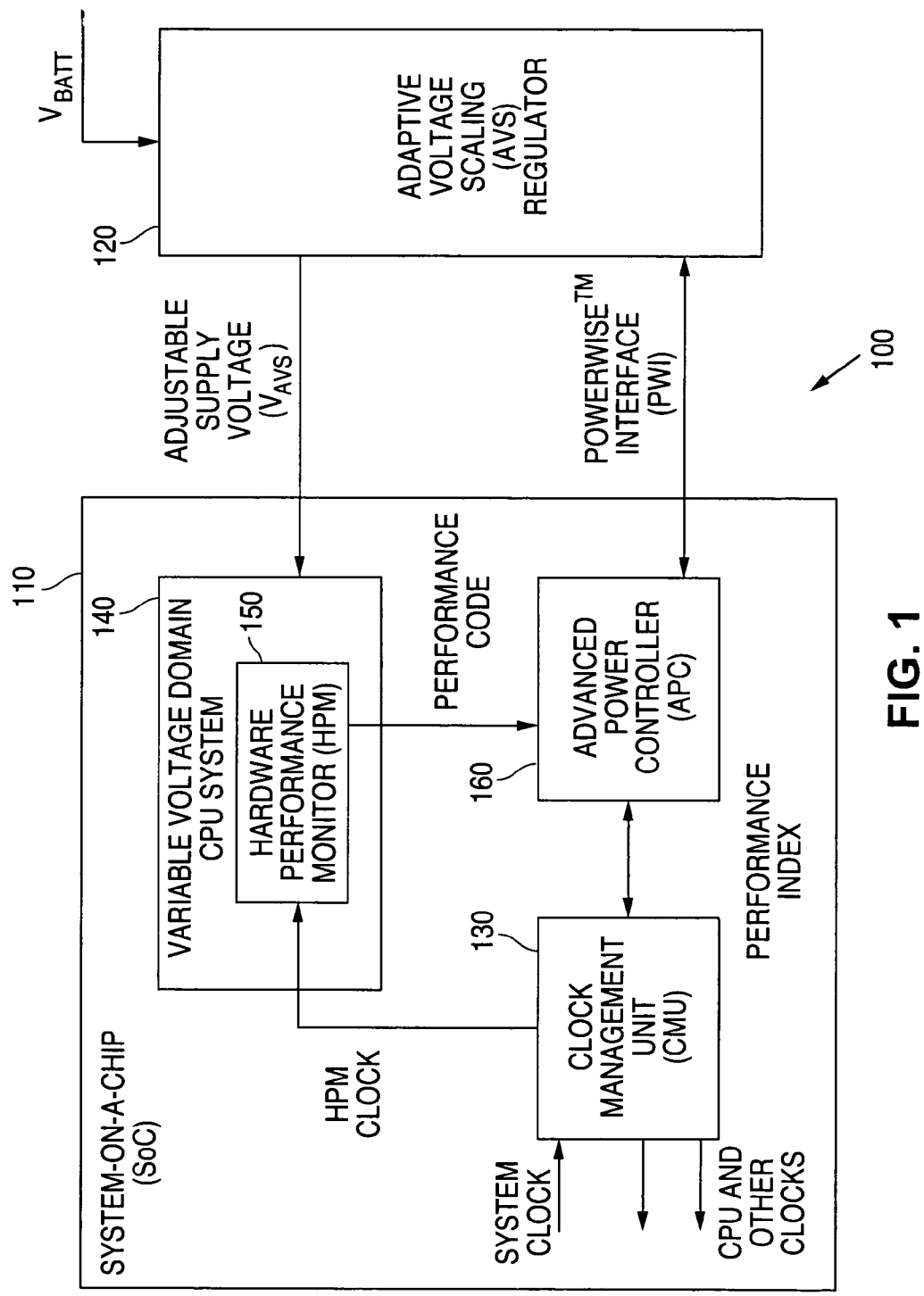
FIG. 1 is a block diagram illustrating an exemplary prior art adaptive voltage scaling (AVS) system.
Figure 2:
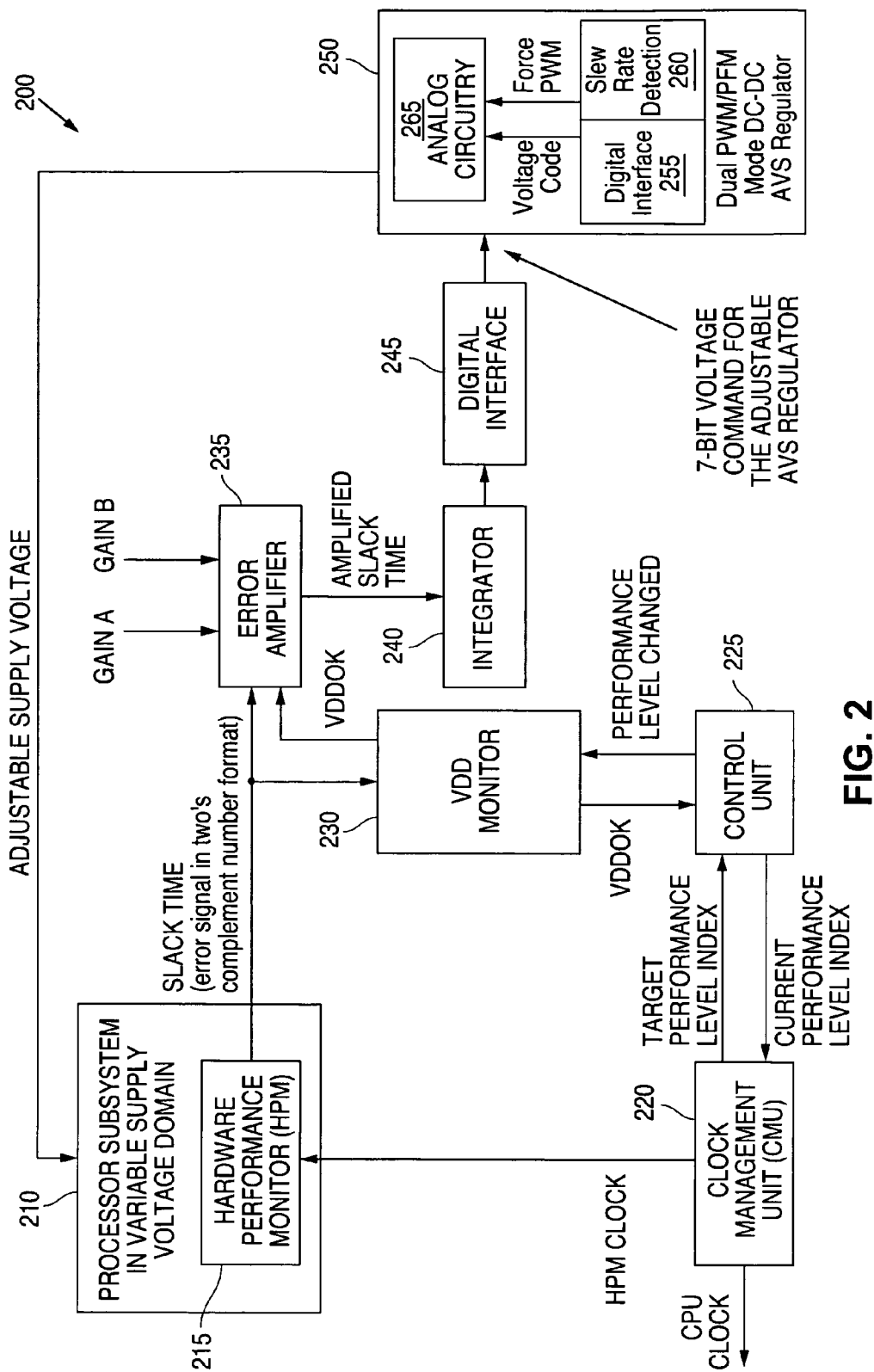
FIG. 2 is a block diagram illustrating an advantageous embodiment of an adaptive voltage scaling (AVS) system of the present invention.

FIG. 2 illustrates a block diagram illustrating an advantageous embodiment of an adaptive voltage scaling (AVS) System 200 of the present invention. AVS system 200 comprises a Processor Subsystem in Variable Supply Voltage Domain 210, Hardware Performance Monitor (HPM) 215, Clock Management Unit (CMU) 220, Control Unit 225, Voltage Monitor 230 (also referred to as VDD Monitor 230), Error Amplifier 235, Integrator 240, and Digital Interface 245. AVS System 200 also comprises an Adaptive Voltage Scaling (AVS) Regulator 250. The AVS Regulator 250 comprises Digital Interface 255, Slew Rate Detection Unit 260, and Analog Circuitry 265. The various elements of AVS System 200 are coupled together as shown in FIG. 2.

Clock Management Unit (CMU) 220 receives a system clock signal (not shown in FIG. 2) from a system clock (also not shown in FIG. 2). Clock Management Unit 220 provides clock frequencies for the central processing unit (CPU) (not shown in FIG. 2). The clock frequencies that are provided to the CPU are represented by the designation "CPU Clock".

Clock Management Unit 220 also provides clock frequencies for the Hardware Performance Monitor (HPM) 215 that is located within the Processor Subsystem in Variable Supply Voltage Domain 210. The clock frequencies that are provided to the Hardware Performance Monitor (HPM) 215 are represented by the designation "HPM Clock".

Clock Management Unit 220 is also coupled to Control Unit 225. Clock Management Unit 220 contains handshaking logic circuitry that is capable of requesting and acknowledging a new operating frequency from the AVS system 200. Clock Management Unit 220 is capable of providing a target performance level index to Control Unit 225. Clock Management Unit 220 is also capable of receiving the current performance level index from Control Unit 225. Control Unit 225 provides control signals to make state transitions during operation of AVS system 200.

The Hardware Performance Monitor (HPM) 215 tracks gate delays in the current operational conditions. The Hardware Performance Monitor (HPM) 215 outputs a performance code that indicates the propagation delay of digital gate cells. The difference between a calibrated reference code in the Hardware Performance Monitor (HPM) 215 and the performance code is an error signal that is referred to as "Slack Time". The Slack Time error signal comprises a digital error signal in a two's complement number format. If the Slack Time is positive an increase in voltage is required. If the Slack Time is negative a decrease in voltage is required.

As shown in FIG. 2, the Hardware Performance Monitor (HPM) 215 outputs the Slack Time error signal to VDD Monitor 230 and to Error Amplifier 235. VDD Monitor 230 is also coupled to Control Unit 225. VDD Monitor 230 evaluates the suitability of supply voltage for the requested performance level. If the supply voltage is suitable, VDD Monitor 230 enables a signal on a first VDDOK signal line to Error Amplifier 235 and enables a signal on a second VDDOK signal line to Control Unit 225. VDD Monitor 230 is also capable of receiving a signal from Control Unit 225 indicating that the performance level has changed.

Error Amplifier 235 receives and amplifies the Slack Time error signal from Hardware Performance Monitor (HPM) 215. Error amplifier 235 has two inputs for receiving two different gain terms. The first gain term is a "high gain" that is designated as "Gain A". The second gain term is a "low gain" that is designated as "Gain B". The gain term that is used determines the speed of response of the system (1) to performance level changes, and (2) to disturbances such as a temperature change, an IR voltage drop, or a ripple voltage of the AVS Regulator 250. The procedure for selecting either "Gain A" or "Gain B" will be discussed more fully below.

The amplified Slack Time error signal from Error Amplifier 235 is provided to Integrator 240. Integrator 240 integrates the amplified Slack Time error at each clock cycle. In the advantageous embodiment illustrated in FIG. 2, the seven (7} top bits of Integrator 240 (i.e., the seven most significant bits (MSB)) represent the voltage level. Integrator 240 sends the bits that represent the voltage level to AVS Regulator 250 via Digital Interface 245. Digital Interface 245 creates a serial seven (7) bit voltage command and sends the voltage command to the Digital Interface 255 of the AVS Regulator 250.

AVS Regulator 250 provides an adjustable (i.e., variable) supply voltage to the CPU system and to the Hardware Performance Monitor (HPM) 215. In the advantageous embodiment illustrated in FIG. 2, AVS Regulator 250 provides the adjustable supply voltage signal to the Processor Subsystem in Variable Supply Voltage Domain 210. AVS Regulator 250 is a dual mode regulator that is capable of operating either in a Pulse Width Modulation (PWM) mode or in a Pulse Frequency Modulation (PFM) mode. AVS Regulator 250 comprises Slew Rate Detection Unit 260. When the Slew Rate Detection Unit 260 detects a fast slew rate, Slew Rate Detection Unit 260 sends a "Force PWM" signal to Analog Circuitry 265 to force the Pulse Width Modulation (PWM) mode to be turned on.

Analog Circuitry 265 also receives the digital voltage code from Digital Interface 255. Analog Circuitry 265 generates and provides the adjustable supply voltage to the CPU system and to the Hardware Performance Monitor (HPM) 215.

AVS System 200 operates in three different states depending on whether (1) the CPU has requested a higher performance level, or (2) the CPU has requested a lower performance level, or (3) the CPU has not requested a change in the performance level. When the CPU needs to operate at a different clock frequency, the CPU requests a new performance level.

A. The CPU Requests a Higher Performance Level.

When the CPU load is high the CPU may request a higher performance level. A higher clock frequency always requires a higher supply voltage. Therefore, the supply voltage must first be increased before the higher clock frequency can be enabled for the CPU. The supply voltage level is increased by first enabling the higher frequency to the Hardware Performance Monitor (HPM) 215. Then an evaluation is made to determine whether the voltage level is sufficient for the requested frequency. When the CPU requests a higher performance level, three parallel processes start to operate.

First, due to the increased clock frequency on the "HPM Clock" signal line, the Hardware Performance Monitor (HPM) 215 outputs a highly positive Slack Time error signal. The CPU selects the high value of feedback gain ("Gain A") for Error Amplifier 235. The Slack Time error signal is amplified in Error Amplifier 235 using the high value of feedback gain ("Gain A"). This results in a rapid increase in the supply voltage level.

Second, VDD Monitor 230 is active during the voltage transient. VDD Monitor 230 starts to evaluate the suitability of the Slack Time error signal for the requested performance level. When the evaluation is successful, it is assumed that the supply voltage level (VDD) is stable. VDD Monitor 230 then enables the VDDOK signal on the VDDOK signal lines to Error Amplifier 235 and to Control Unit 225. Now the Clock Management Unit 220 can enable the clock frequency for the CPU. The CPU then selects the low value of feedback gain ("Gain B") for Error Amplifier 235. The Slack Time error signal is amplified in Error Amplifier 235 using the low value of feedback gain ("Gain B"). The integration in Integrator 240 then proceeds using the low value of feedback gain ("Gain B").

Third, the AVS Regulator 250 recognizes the request to make a large voltage level change. AVS Regulator 250 changes its internal mode to a state where it is able to make a large voltage level change. After a constant delay, AVS Regulator 250 is free to change its mode to a mode that provides the best power efficiency.

B. The CPU Requests a Lower Performance Level.

When the CPU load is low the CPU may request a lower performance level. Because the currently available voltage level is always suitable for the lower clock frequency, the currently available voltage level is immediately enabled for the CPU. When the CPU requests a lower performance level, three parallel processes start to operate.

First, due to the lowered clock frequency on the "HPM Clock" signal line, the Hardware Performance Monitor (HPM) 215 outputs a highly negative Slack Time error signal. The CPU selects the high value of feedback gain ("Gain A") for Error Amplifier 235. The Slack Time error signal is amplified in Error Amplifier 235 using the high gain ("Gain A"). This results in a rapid decrease in the supply voltage level.

Second, VDD Monitor 230 is active during the voltage transient. VDD Monitor 230 starts to evaluate the suitability of the Slack Time error signal for the requested performance level. When the evaluation is successful, it is assumed that the supply voltage level (VDD) is stable. VDD Monitor 230 then enables the VDDOK signal on the VDDOK signal lines to Error Amplifier 235 and to Control Unit 225. The CPU then selects the low value of feedback gain ("Gain B") for Error Amplifier 235. The integration in Integrator 240 the proceeds using the low value of feedback gain ("Gain B").

Third, the AVS Regulator 250 recognizes the request to make a large voltage level change. AVS Regulator 250 changes its internal mode to a state where it is able to make a large voltage level change. After a constant delay, AVS Regulator 250 is free to change its mode to a mode that provides the best power efficiency.

C. The CPU does not Request Different Performance Level

When the VDDOK signal is asserted after a performance level change, the supply voltage remains at a state where a large voltage change is not done. Only small changes to the voltage level can occur. For example, a System-on-a-Chip (SoC) integrated circuit may be heating up. Consequently, the gate delay of the SoC integrated circuit is increasing. To compensate for the reduced gate delay performance, the closed loop AVS System 200 will slightly increase the supply voltage. Conversely, the gate delay of the SoC integrated circuit may be decreasing (due to decreasing temperature or a lower IR drop). To compensate for the increased gate delay performance, the closed loop AVS System 200 will slightly decrease the supply voltage.

When a performance level change is not taking place, the AVS System 200 is placed in a state in which it responds slowly to all external disturbances (e.g., dynamic IR voltage drop, temperature changes, ripple voltage). A disturbance that has a frequency that is higher than a cut-off frequency of the closed loop is considered to be noise. The AVS System 200 will not attempt to compensate for such a disturbance by changing the voltage level.

This also includes a possible disturbance from a ripple voltage on the supply voltage (due to the internal operation of the AVS Regulator 250). The closed loop AVS System 200 will not try to compensate ripple voltage by adjusting the supply voltage (in a direction that is opposite to the direction of the ripple voltage). Instead, the AVS System 200 "averages" the ripple voltage to a constant direct current (DC) level. This makes it possible to use the operational modes of the AVS Regulator 250 even though the AVS Regulator 250 has a high ripple voltage at its output voltage (due to the internal operation of the AVS Regulator 250).

Figure 3:
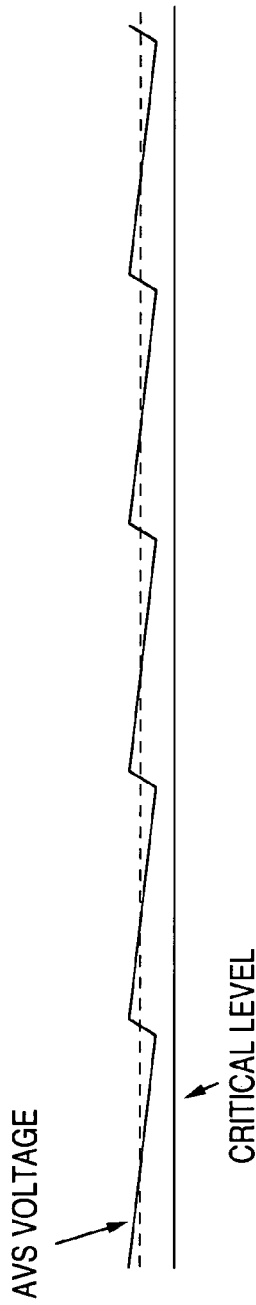
FIG. 3 is a timing diagram illustrating how a process of adaptive voltage scaling (AVS) voltage tracking changes system characteristics by gradually increasing an AVS voltage level in accordance with the principles of the present invention.

FIG. 3 is a timing diagram that illustrates how the process of adaptive voltage scaling (AVS) voltage tracking changes the system characteristics by gradually increasing the AVS voltage level. The target voltage level is shown in FIG. 3 as a dotted line. The ripple voltage on the supply voltage (i.e., the ripple voltage on the AVS voltage) does not change the target voltage level. The solid line at the bottom of the figure represents the critical voltage level. The critical voltage level is the voltage level at which the CPU fails to operate (due to the voltage being too low). The ripple voltage on the AVS voltage signal does not go low enough to reach the critical voltage level.

The behavior of the voltage levels shown in FIG. 3 is accomplished by lowering the feedback gain for the state where the CPU is not changing its performance level. The feedback gain is lowered by using the low feedback gain ("Gain B") instead of the high feedback gain ("Gain A"). Whenever the CPU requests a new performance level, the feedback gain is increased, so that the rapid voltage level change can be done.

There is an additional benefit of momentarily switching to a lower feedback gain level. It is that the activity in the Digital Interface 255 of the AVS Regulator 250 is minimized. This is because the response to the disturbance is slow.

The use of the variable feedback gain feature in the AVS System 200 makes it possible to efficiently use a dual Pulse Width Modulation (PWM)/Pulse Frequency Modulation (PFM) mode Direct Current (DC) to Direct Current (DC) switching regulator. Dual PWM/PFM mode DC-DC AVS Regulator 250 comprises a switcher circuit in the Slew Rate Detection Unit 260 that automatically switches the mode to Pulse Width Modulation (PWM) whenever a large voltage level change is requested by AVS System 200. When the supply voltage VDD is back in a stable state, the switcher circuit resets the mode back to Pulse Frequency Modulation (PFM) mode in order to maintain high power efficiency during light load conditions.

Although an advantageous embodiment of the invention has been described with reference to a dual mode adaptive voltage scaling regulator, it is understood that a the variable feedback gain feature may be used with an adaptive voltage scaling regulator that has one or more modes of operation. The adaptive voltage scaling regulator must be capable of accomplishing a rapid voltage level change when necessary. If the adaptive voltage scaling regulator is capable of operating in more than one mode, the adaptive voltage scaling regulator must be able to activate the proper mode. If the adaptive voltage scaling regulator has only one mode, the mode must allow a rapid voltage level change to be accomplished.

In summary, consider the dual mode adaptive voltage scaling (AVS) regulator 250 that is capable of alternately operating in a Pulse Width Modulation (PWM) mode and a Pulse Frequency Modulation (PFM) mode. When the central processing unit (CPU) of the adaptive voltage scaling (AVS) system 200 requests a new performance level, the level of feedback gain is increased, so that a rapid supply voltage change may be accomplished. The mode of dual mode adaptive voltage scaling (AVS) regulator 250 is set to a Pulse Width Modulation (PWM) mode during the large voltage level change.

After the value of supply voltage is stabilized at its new value, the mode of dual mode adaptive voltage scaling (AVS) regulator 250 can be reset to the Pulse Frequency Modulation mode in order to maintain high power efficiency during light load conditions. Adaptive voltage scaling (AVS) regulator 250 changes its mode to Pulse Frequency Modulation only if it detects a light load (i.e., a load under a specified threshold) so that changing the mode to Pulse Frequency Modulation will improve the power efficiency of adaptive voltage scaling (AVS) regulator 250. If a relatively high load is detected, adaptive voltage scaling (AVS) regulator 250 will not change the mode to Pulse Frequency Modulation but will keep the Pulse Width Modulation mode activated.

The drawback of using the Pulse Frequency Modulation (PFM) mode is a high peak-to-peak ripple voltage that must be rejected by the AVS System 200. This means that the voltage compensation procedure must not take place for the ripple voltage. The AVS System 200 must consider the ripple voltage to be noise. The rejection of the ripple voltage is accomplished by using the low feedback gain level ("Gain B") that rejects the ripple voltage. The frequency of the ripple voltage is higher than the cut-off frequency of the AVS closed loop when the low feedback gain level ("Gain B") is used.

Figure 4:
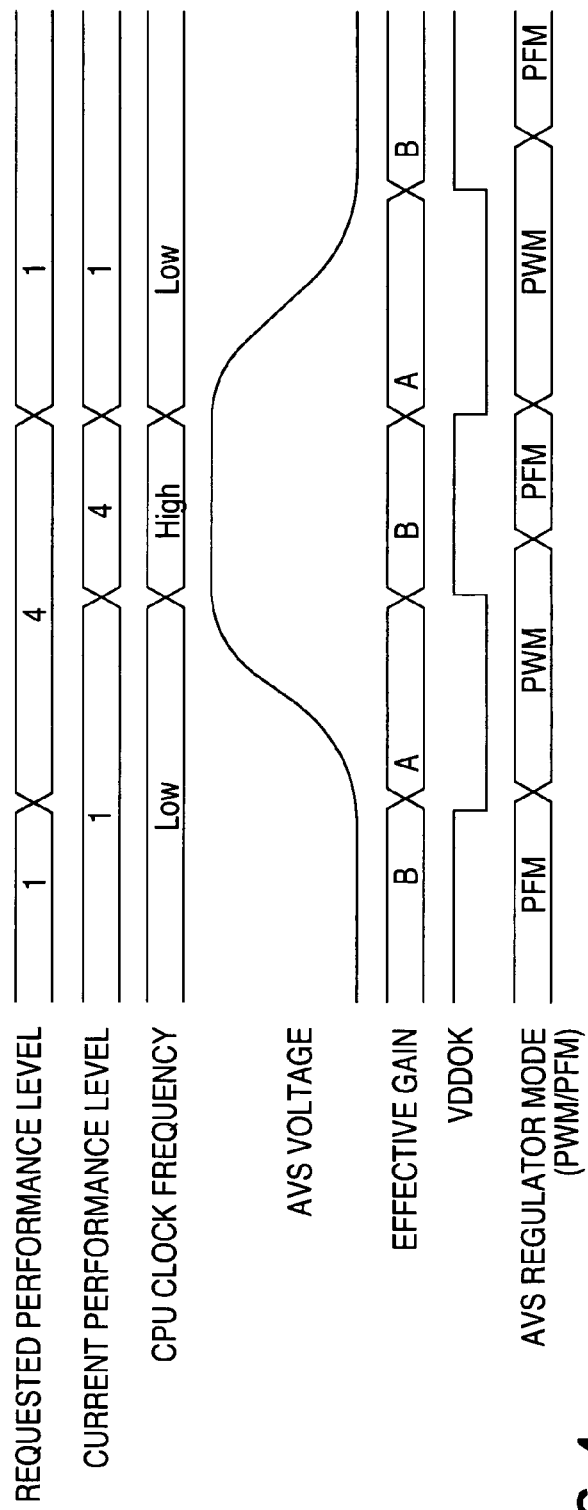
FIG. 4 is a timing diagram illustrating a performance level change in an adaptive voltage scaling (AVS) system of the present invention.

FIG. 4 is a timing diagram illustrating a performance level change in an adaptive voltage scaling (AVS) system of the present invention. At first the requested performance level signal is "low" (designated by numeral "1") and the current performance level signal is "low" (also designated by numeral "1"). The CPU clock frequency is "Low" and the AVS voltage is at low voltage level. The VDDOK signal is enabled and the AVS Regulator 250 is in Pulse Frequency Modulation (PFM) mode.

The CPU then requests a higher performance level. This causes the requested performance level signal to go "high" (designated by numeral "4"). The VDDOK signal is disabled and the feedback gain is changed from a low feedback gain level ("Gain B") to a high feedback gain level ("Gain A"). AVS Regulator 250 changes to Pulse Width Modulation (PWM) mode. The AVS voltage begins to increase to the requested higher level of voltage.

After the AVS voltage (VDD) reaches the requested higher level of voltage, the CPU clock frequency signal goes from a "Low" level to a "High" level and the current performance level signal goes from a "low" level (designated by numeral "1") to a "high" level (designated by numeral "4"). The effective gain is changed back to the low feedback gain level ("Gain B") and the VDDOK signal is enabled. The AVS Regulator 250 changes its mode back to Pulse Frequency Modulation (PFM) after the AVS voltage (VDD) has stabilized and a constant delay has expired.

The timing diagrams in FIG. 4 also illustrate the changes that occur when the AVS voltage is "high" and the CPU requests a lower performance level. The requested performance level signal for the "high" level (designated by numeral "4") is disabled and the requested performance level signal for the "low" level (designated by numeral "1") is enabled. The current performance level signal for the "high" level of performance (designated by numeral "4") is disabled and the current performance level signal for the "low" level of performance (designated by numeral "1") is enabled. The CPU clock frequency for the "High" level is disabled and the CPU clock frequency for the "Low" level is enabled.

The VDDOK signal is disabled and the feedback gain is changed from a low feedback gain level ("Gain B") to a high feedback gain level ("Gain A"). AVS Regulator 250 changes to Pulse Width Modulation (PWM) mode. The AVS voltage begins to decrease to the requested lower level of voltage.

After the AVS voltage (VDD) reaches the requested lower level of voltage, the effective gain is changed back to the low feedback gain level ("Gain B") and the VDDOK signal is enabled. The AVS Regulator 250 changes its mode back to Pulse Frequency Modulation (PFM) after the AVS voltage (VDD) has stabilized and a constant delay has expired.

Figure 5:
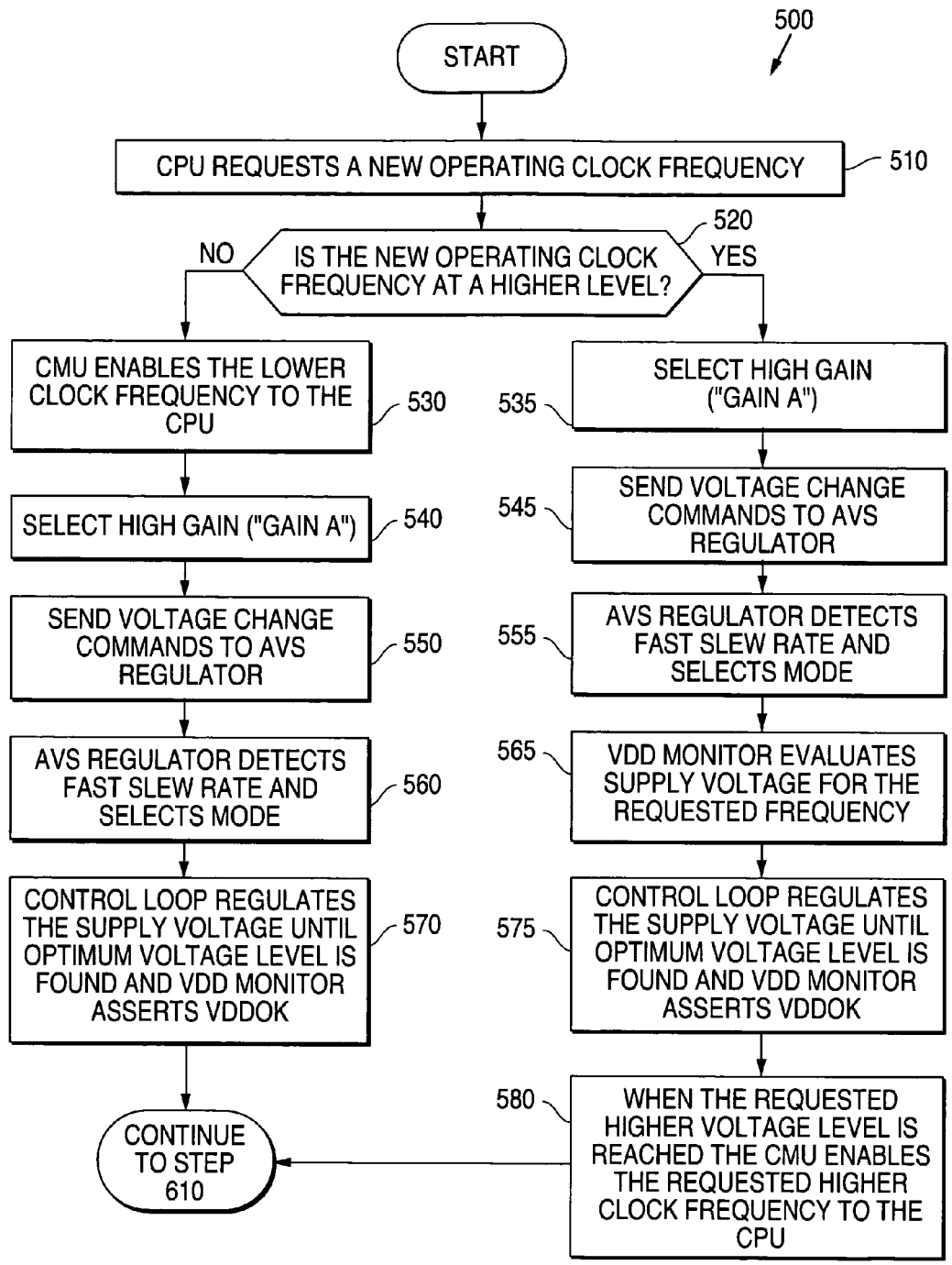
FIG. 5 is a first flow chart illustrating a first portion of an advantageous embodiment of a method of the invention.

FIG. 5 is a first flow chart 500 illustrating a first portion of an advantageous embodiment of a method of the present invention. In the first step the CPU requests a new operating clock frequency (step 510). A decision is then made to determine whether the new operating clock frequency is at a higher level (decision step 520). If the requested new operating clock frequency is not at a higher level, the Clock Management Unit (CMU) 220 enables the lower clock frequency to the CPU (step 530). Then the CPU selects the high feedback gain level ("Gain A") (step 540).

Then the AVS System 200 sends the voltage change commands to the AVS Regulator 250 (step 550). This causes the supply voltage to begin to decrease. The AVS Regulator 250 detects a fast slew rate in the voltage adjust commands and selects the appropriate mode to make the voltage level change (step 560). The control loop then regulates the supply voltage until the optimum voltage level is found and the VDD Monitor 230 asserts the VDDOK signal (step 570). Control then passes to step 610 of FIG. 6.

Figure 6:
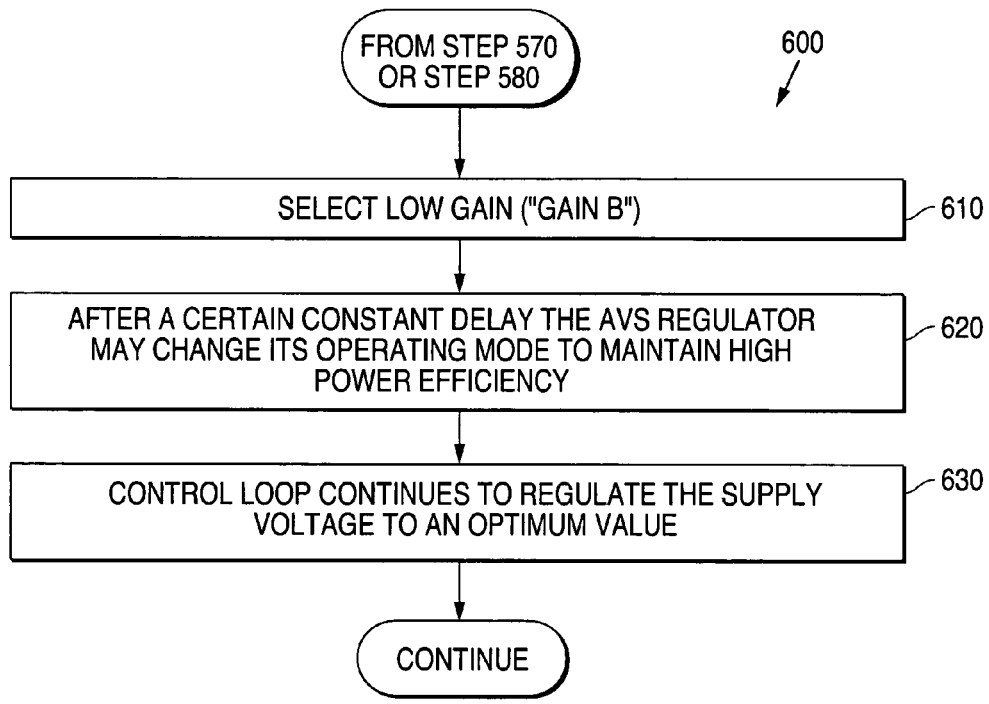
FIG. 6 is a second flow chart illustrating a second portion of an advantageous embodiment of a method of the invention.

FIG. 6 is a second flow chart 600 illustrating a second portion of an advantageous embodiment of a method of the present invention. Control passes to step 610 from step 570 of FIG. 5. The CPU selects the low feedback gain level ("Gain B") (step 610). After a certain constant delay the AVS Regulator 250 may change its operating mode (e.g., from PWM mode to PFM mode) in order to maintain high power efficiency (step 620). The control loop continues to regulate the supply voltage to an optimum value (step 630) and the process continues.

Because the low feedback gain level ("Gain B") is now selected, the response to any disturbance (e.g., temperature, IR voltage drop, ripple voltage) is slow. This means that the AVS Regulator 250 is able to operate in a high power efficient mode in which a high ripple voltage is present on the supply voltage.

Returning to FIG. 5, if the requested new operating clock frequency at decision step 520 is at a higher level, the CPU selects the high feedback gain level ("Gain A") (step 535). Then the AVS System 200 sends the voltage change commands to the AVS Regulator 250 (step 545). This causes the supply voltage to begin to increase. The AVS Regulator 250 detects a fast slew rate in the voltage adjust commands and selects the appropriate mode to make the voltage level change (step 555).

The VDD Monitor 230 evaluates the value of the supply voltage for the requested frequency and disables the VDDOK signal (step 565). The control loop then regulates the supply voltage until the optimum voltage level is found and the VDD Monitor 230 asserts the VDDOK signal (step 575). When the requested higher voltage level is reached, the Clock Management Unit 220 enables the requested higher clock frequency to the CPU (step 580). Control then passes to from step 580 of FIG. 5 to step 610 of FIG. 6.

The CPU selects the low feedback gain level ("Gain B") (step 610). After a certain constant delay the AVS Regulator 250 changes its operating mode (e.g., from PWM mode to PFM mode) in order to maintain high power efficiency (step 620). The control loop continues to regulate the supply voltage to an optimum value (step 630) and the process continues.

The operation of the system and method of the present invention provides very efficient closed loop feedback control in an adaptive voltage scaling system. In particular, the present invention efficiently controls the slew rate speed of the adjustable supply voltage. In addition, the efficient operation of the adaptive voltage scaling system of the invention minimizes the level of digital signal activity between Digital Interface 245 and Digital Interface 255 (in AVS Regulator 250). Although the principles of the present invention have been described with reference to an embodiment that utilizes two different values of feedback gain, it is understood that the present invention is not limited to only two values of feedback gain. It is understood that the principles of the present invention may be utilized in an embodiment that utilizes three or more different values of feedback gain.

Although the present invention has been described with several embodiments, various changes and modifications may be suggested to one skilled in the art. It is intended that the present invention encompass such changes and modifications as fall within the scope of the appended claims.

What is claimed is:

1. An apparatus for providing closed loop feedback control in an adaptive voltage scaling system, said apparatus comprising closed loop feedback circuitry having a variable feedback gain; and
    an error amplifier circuit that is capable of alternately operating with one of: a low value of feedback gain and a high value of feedback gain;
    circuitry for selecting one of said low value of feedback gain and said high value of feedback gain a hardware performance monitor that is capable of generating a slack time error signal; and
    a voltage monitor that is capable of receiving said slack time error signal from said hardware performance monitor and, based on a value of said slack time error signal evaluating suitability of a supply voltage of said adaptive voltage scaling system for a requested performance level of said adaptive voltage scaling system.

2. The apparatus as set forth in claim 1 wherein
    the error amplifier circuit is capable of alternately operating with at least two different values of feedback gain; and
    circuitry for selecting one of said at least two different values of feedback gain.

3. The apparatus as set forth in claim 1 wherein said voltage monitor provides a control signal to said error amplifier circuit signifying that said voltage monitor has determined that a supply voltage of said adaptive voltage scaling system is suitable for said requested performance level of said adaptive voltage scaling system.

4. The apparatus as set forth in claim 3 wherein said apparatus further comprises:
    a dual mode adaptive voltage scaling regulator that is capable of alternately operating in one of: a pulse width modulation mode and a pulse frequency modulation mode;
    wherein said dual mode adaptive voltage scaling regulator comprises a slew rate detection unit that is capable of detecting a slew rate of said supply voltage signal.

5. The apparatus as set forth in claim 4 wherein said dual mode adaptive voltage scaling regulator activates a pulse width modulation mode of operation when said slew rate detector detects a slew rate that is greater than a predetermined threshold value of slew rate of said supply voltage signal.

6. The apparatus as set forth in claim 3 wherein the error amplifier circuit is capable of alternately operating with at least two different values of feedback gain.

7. The apparatus as set forth in claim 6 wherein the error amplifier circuit further comprises circuitry for selecting one of said at least two different values of feedback gain.

8. A method for changing a level of an adjustable supply voltage in an adaptive voltage scaling system, said method comprising the steps of:
    receiving from a central processing unit a request for a new operating clock frequency;
    determining that said requested new operating clock frequency is a higher frequency than a current operating clock frequency;
    selecting a high value of feedback gain for an error amplifier that is capable of alternately operating with one of: a low value of feedback gain and a high value of feedback gain;
    operating said error amplifier with said high value of feedback gain; and
    sending at least one voltage change command to an adaptive voltage scaling regulator of said adaptive voltage scaling system.

9. The method as set forth in claim 8 further comprising the steps of:
    detecting in said adaptive voltage scaling regulator a slew rate of an adjustable supply voltage signal that is greater than a predetermined threshold value of slew rate of said adjustable supply voltage signal; and
    in response to detecting said slew rate, selecting a pulse width modulation mode for operating said adaptive voltage scaling regulator.

10. The method as set forth in claim 9 further comprising the steps of:
    evaluating in a voltage monitor a suitability of said adjustable supply voltage for said requested new operating clock frequency;
    regulating said adjustable supply voltage in a feedback control loop until an optimum voltage level is obtained for said requested new operating clock frequency; and
    enabling said new operating clock frequency to said central processing unit.

11. The method as set forth in claim 10 further comprising the steps of:
    selecting a low value of feedback gain for said error amplifier that is capable of alternately operating with one of: a low value of feedback gain and a high value of feedback gain; and
    waiting for a constant delay period; and
    selecting a pulse frequency modulation mode for operating said adaptive voltage scaling regulator.

12. A method for changing a level of an adjustable supply voltage in an adaptive voltage scaling system, said method comprising the steps of:
    receiving from a central processing unit a request for a new operating clock frequency;
    determining that said requested new operating clock frequency is a lower frequency than a current operating clock frequency;
    enabling said new operating clock frequency to said central processing unit;

selecting a high value of feedback gain for an error amplifier that is capable of alternately operating with one of: a low value of feedback gain and a high value of feedback gain;

operating said error amplifier with said high value of feedback gain; and sending at least one voltage change command to an adaptive voltage scaling regulator of said adaptive voltage scaling system.

13. The method as set forth in claim 12 further comprising the steps of:

detecting in said adaptive voltage scaling regulator a slew rate of an adjustable supply voltage signal that is greater than a predetermined threshold value of slew rate of said adjustable supply voltage signal; and in response to detecting said slew rate, selecting a pulse width modulation mode for operating said adaptive voltage scaling regulator.

14. The method as set forth in claim 13 further comprising the step of:

regulating said adjustable supply voltage in a feedback control loop until an optimum voltage level is obtained for said requested new operating clock frequency.

15. The method as set forth in claim 14 further comprising the steps of:

selecting a low value of feedback gain for said error amplifier that is capable of alternately operating with one of: a low value of feedback gain and a high value of feedback gain; and waiting for a constant delay period; and selecting a pulse frequency modulation mode for operating said adaptive voltage scaling regulator.

16. A method for maintaining a level of an adjustable supply voltage in an adaptive voltage scaling system, said method comprising the steps of:

determining that a central processing unit of said adaptive voltage scaling system is not requesting a new operating clock frequency;

determining that gate delay of said adaptive voltage scaling system is one of: increasing due to a disturbance and decreasing due to a disturbance; and in response to a determination of increasing gate delay, increasing a level of said adjustable supply voltage; and in response to a determination of decreasing gate delay, decreasing a level of said adjustable supply voltage.

17. The method as set forth in claim 16 wherein said disturbance is one of: a dynamic IR voltage drop and a temperature change.

18. The method as set forth in claim 16 wherein said disturbance is a ripple voltage.

19. The method as set forth in claim 18 further comprising the step of:

averaging said ripple voltage to a constant direct current (DC) level.

20. The method as set forth in claim 19 wherein said step of averaging said ripple voltage comprises the step of:

selecting a low value of feedback gain for an error amplifier of said adaptive voltage scaling regulator when said central processing unit is not changing its performance level.

* * * * *